United States Patent [19]
Zardi et al.

[11] Patent Number: 5,951,953
[45] Date of Patent: Sep. 14, 1999

[54] MIXING ASSEMBLY FOR GASEOUS FLOWS AT DIFFERENT TEMPERATURES, IN PARTICULAR FOR HETEROGENEOUS EXOTHERMIC SYNTHESIS REACTORS

[75] Inventors: Umberto Zardi, Breganzona, Switzerland; Giorgio Pagani, Milan, Italy

[73] Assignee: Methanol Casale S.A., Lugano-Besso, Switzerland

[21] Appl. No.: 08/682,710

[22] PCT Filed: Feb. 25, 1995

[86] PCT No.: PCT/EP95/00718

§ 371 Date: Jul. 30, 1996

§ 102(e) Date: Jul. 30, 1996

[87] PCT Pub. No.: WO95/23642

PCT Pub. Date: Sep. 8, 1995

[30] Foreign Application Priority Data

Mar. 1, 1994 [CH] Switzerland ............... 593/94

[51] Int. Cl.⁶ ................. B01J 8/04; F28D 8/04; F28D 7/00
[52] U.S. Cl. ............ 422/191; 422/194; 422/198; 422/200
[58] Field of Search ............... 422/191, 148, 422/192, 194, 198, 200, 201; 423/360

[56] References Cited

U.S. PATENT DOCUMENTS

| | | | |
|---|---|---|---|
| 2,632,692 | 3/1953 | Korin et al. .......... | 23/288 |
| 3,254,967 | 6/1966 | Wentworth .......... | 23/288 |
| 3,480,407 | 11/1969 | Wentworth et al. .......... | 23/288 |
| 3,946,104 | 3/1976 | Förster et al. .......... | 423/659 |
| 4,859,425 | 8/1989 | Zardi .......... | 422/148 |
| 4,946,657 | 8/1990 | Zardi .......... | 422/148 |

OTHER PUBLICATIONS

*Methanol Technology,* 6147 Nitrogen (1994) Jan./Feb., No. 207, London, GB, "Meeting today's challenges" pp. 24–30.

Primary Examiner—Laurie Scheiner
Assistant Examiner—Jeffrey S. Parkin
Attorney, Agent, or Firm—Sughrue, Mion, Zinn, Macpeak & Seas, PLLC

[57] ABSTRACT

The present invention relates to method for mixing gaseous flows at different temperatures. In particular, the present invention relates to heterogeneous exothermic synthesis reactors of the type including a plurality of superimposed catalytic beds wherein at least one of the beds is provided with a gas permeable wall for outlet of a hot gas flow. This method includes the steps of supplying gaseous reagents to at least one bed; reacting the gaseous reagents in that bed; and collecting a hot reaction gas flow leaving the gas permeable wall in an air space defined between the bed and a baffle extending below and parallel thereto. Further steps require directing the hot gas flow in the air space radially outward to an annular opening of constant thickness defined between the baffle and a side wall supporting the bed, wherein the ratio of the width of the annular opening and the thickness of the air space being between 0.2 and 1. Then, hot gas flow is discharged from air space through the annular opening and is subjected to a pressure drop of predetermined magnitude so as to uniform its flow rate. Finally, a cooling gas flow is injected into hot gas flow thus obtained, wherein cooling gas flow is provided at predetermined velocity from a perforated distributor supported below baffle, which is at a predetermined distance from the annular opening.

4 Claims, 3 Drawing Sheets

MIXING ASSEMBLY FOR GASEOUS FLOWS AT DIFFERENT TEMPERATURES, IN PARTICULAR FOR HETEROGENEOUS EXOTHERMIC SYNTHESIS REACTORS

DESCRIPTION

1. Field of Application

The present invention relates to a mixing assembly for gaseous flows at different temperatures, in particular for heterogeneous exothermic synthesis reactors comprising a plurality of superimposed catalytic beds and in which at least one of the beds is provided with a gas permeable wall for outlet of a flow of hot gas, said assembly including:

a baffle extending below and parallel to said gas permeable wall with which it defines an air space for collection of said hot gas flow;

an annular opening for outlet of said hot gas flow from said air space defined between said baffle and a side wall supporting said at least one bed associated with the reactor;

a perforated distributor for a cooling gas flow supported below said baffle at a predetermined distance from said annular opening.

In the description given below and in the followings claims, the term: hot gas, is understood to mean a partially reacted gas or gas mixture leaving a catalytic bed of a synthesis reactor, in which it has reacted exothermically. By way of example, in the exothermic heterogeneous synthesis reaction of methanol said gas has a temperature generally between 240° C. and 290° C.

On the contrary, the term: cooling gas, is understood to mean a cooling gas having a temperature lower than that of the partially reacted gas leaving the catalytic bed. Usually said gas consists of a predetermined part of reagent gasses and, again in the case of methanol synthesis, has a temperature generally between 60° C. and 200° C.

In the terminology of the field the cooling gas is also indicated by the term 'quench gas'.

As known, during performance of an exothermic heterogeneous synthesis reaction it is necessary to cool the hot gas flow leaving each catalytic bed so as to bring the temperature back to a value such as to allow reaching the maximum conversion yield in the next bed.

2. Prior Art

For this purpose, the reactors assigned to this type of synthesis are provided with devices or mixing assemblies designed to cool the partially reacted gas mixtures flowing through a single catalytic bed or between a plurality of superimposed catalytic beds.

Thus for example in European patent application EP-A-0 359 952 of this applicant there is described an exothermic heterogeneous methanol synthesis reactor, in which are supported a plurality of superimposed catalytic beds in mutually spaced relationship between which are provided respective mixing assemblies for intermediate cooling of the reaction products by a flow of quench gas.

Said mixing assembly comprises a baffle extending below and parallel to the gas permeable bottom of at least one catalytic bed with which it defines an air space for collection of a hot gas flow leaving said at least one bed.

An annular opening for outlet of said hot gas flow from said air space is defined between said baffle and the side wall of the reactor supporting said at least one bed.

Below said baffle at a predetermined distance from the annular opening is supported a perforated distributor for a cooling gas flow.

Mixing of the hot synthesis gas flow with a cooling gas flow takes place in the peripheral zone of the reactor near the side wall supporting the catalytic beds.

If on one hand this type of assembly allows obtaining a certain degree of mixing of the gaseous flows, on the other hand it is not possible to achieve substantially complete mixing of the hot gases and cold gases before they enter in contact with the next catalytic bed.

In addition, the device in accordance with the prior art is not able of correcting and uniforming any local flow rate and temperature unevenness of the hot gases leaving said annular opening.

This local unevenness in flow rate and temperature are due to the fact that the hot gas flow coming from a bed containing a generally granular catalytic mass is subject to uncontrolled variations in flow rate and, if there are very extensive so-called catalyst "packing" phenomena, in temperature as well.

In other words, the mixing assembly just described does not allow achievement of an optimal degree of hot and cold gaseous flows mixing nor compensation in an independent manner for any local flow rate and temperature unevenness of the hot gas flow.

The inability of known devices to correct these variations results inevitably in a non optimal mixing between the hot gases and the cold gases and, consequently, in the formation of temperature differences in the local flow rates with deviations even over 20° C. in the gaseous flow leaving the mixing assembly.

All this causes reduced conversion yield of the synthesis reactor compared with that theoretically possible.

SUMMARY OF THE INVENTION

The technical problem underlying the present invention is to make available a mixing assembly for gaseous flows at different temperatures, in particular for heterogeneous exothermic synthesis reactors, allowing achievement of a substantially complete and uniform mixing of hot gases and cold gases and capable of independently absorbing any local unevenness in the hot gas flow rate.

The problem is solved by an assembly of the type set forth above and characterized in that the air space for collection of the hot gas flow has a constant thickness in correspondence of the annular opening and in that the ratio of the width of said annular opening to said thickness of said air space is between 0.2 and 1.

In accordance with the present invention it was found that when the thickness of the air space is constant in correspondence of the annular opening and when the ratio of the width of said annular opening to the thickness of said air space is between the above said values any local unevenness of the hot gas flow leaving said air space is absorbed since the hot gas flow is subjected to a pressure drop of predetermined magnitude.

The flow rate of the hot gas flow thus redistributed remains uniform for a period of time inversely proportional to the above said ratio.

This condition is essential for achieving a gaseous flow leaving the mixing assembly with homogeneous temperature, temperature deviations being limited to a few degrees centigrade.

Said pressure drop to which is subjected the hot gas flow depends on said ratio between the width of said annular opening and the thickness of said air space and is preferably between $0.5 \times 10^{-3}$ bar and $6 \times 10^{-3}$ bar, depending on the characteristics of the heterogeneous synthesis process.

In heterogeneous exothermic synthesis reactors of the type considered the thickness of said air space depends on the dimensions of the corresponding catalytic beds and is between a minimum of 60 mm and a maximum of 300 mm, generally between 120 mm and 180 mm.

The distributor is preferably of substantially toroidal shape and comprises at least one row of holes mutually spaced and pitched, and extending along a generatrix thereof.

The diameter of the holes of the row or rows of holes must be such as to ensure that the cooling gas jets have both an entrainment or suction effect on the entire hot gas flow coming from the air space above and an optimal penetration in it. The pitch is further defined in such a manner as to ensure a slight interference between the cooling gas jets.

For this purpose the holes have advantageously a diameter between 5 mm and 15 mm while the pitch is preferably between 20 mm and 60 mm.

The choice of the values within the above defined ranges depends on the physical characteristics of the gases to be mixed, in particular on the ratio between the flow rates of the gaseous flows.

The above said characteristics of pressure drop, entrainment and penetration allow achievement of an optimal mixing degree of the hot gases and cold gases immediately downstream of the distributor.

Depending on the characteristics of the heterogeneous synthesis process, the number of rows and the diameter of the holes, and the selected pitch, it is quite easy for those skilled in the art to determine the pressure of the cooling gas flow in said distributor in order to achieve the desired entrainment effect and penetration described above.

In a particular and advantageous embodiment of the present mixing assembly, the distributor comprises a first and a second row of superimposed holes defining with a horizontal plane passing through the distributor axis an angle between $-10°$ and $+10°$ and between $-20°$ and $-40°$, respectively.

The second row performs the complete entrainment of the gas flow also comprising the cooling gas injected from the first row thus obtaining an advantageous further intimate mixing of the gaseous flows.

It was also found that for optimal mixing of the hot gas with the cooling gas the toroidal distributor preferably must not interfere with the hot gas flow coming from the air space.

In this manner it is possible to maintain the pressure downstream of the annular opening uniform and thus to promote achievement of a uniform local flow rate of the hot gas flow and also to allow the strong recirculations of said hot gas, which are to be found around the distributor, to reach the holes without excessive local pressure drops.

In accordance with the present invention the distance between the distributor and the side wall supporting the catalytic bed or beds is also preferably between 1 and 3 times the width of said annular opening.

The distance of the distributor from the baffle is preferably between 0.25 and 0.5 times the distance between the distributor and the side wall.

Advantageously, the mixing assembly comprises also a deflector or turbulence generator supported below said baffle at a distance between 300 mm and 500 mm to promote intimate mixing of the hot gases and cold gases.

In a particular and advantageous embodiment the deflector comprises a flat portion and a conical portion with the conical portion comprising a row of paddles perpendicular thereto and turned towards said baffle so as to impart to the mixed gas flow a rotary movement.

This rotary movement of the mixed gas permits additional attenuation of any local temperature differences due to uneven distribution of the catalyst in the bed following so-called catalyst "packing" phenomena.

In accordance with another aspect of the present invention there is also made available a method for mixing gaseous flows at different temperatures, in particular for heterogeneous exothermic synthesis reactors of the type comprising a plurality of superimposed catalytic beds and in which at least one of the beds is provided with a gas permeable wall for outlet of a hot gas flow, said method comprising the steps of:

supplying gaseous reagents to said at least one catalytic bed;

reacting said gaseous reagents in said at least one catalytic bed;

collecting a hot reaction gas flow leaving said gas permeable wall in an air space defined between said at least one bed and a baffle extending below and parallel thereto;

uniforming the flow rate of the hot gas flow leaving said air space by subjecting said flow to a pressure drop of predetermined magnitude;

injecting in the hot gas flow thus achieved a cooling gas flow outgoing at predetermined velocity from a perforated distributor supported below said baffle at a predetermined distance from said annular opening.

Advantageously the pressure drop is between $0.5 \times 10^{-3}$ bar and $6 \times 10^{-3}$ bar and preferably between $2.5 \times 10^{-3}$ bar and $4 \times 10^{-3}$ bar.

By proceeding in this manner the flow rate of the hot gas flow leaving said air space is made substantially uniform even locally, obtaining a gaseous flow leaving the mixing assembly at nearly constant temperature, with temperature deviations not above about $3°$ C.

The velocity of the cooling gas flow leaving the distributor must be such as to ensure to the cooling gas jets both of an entrainment or suction effect of all the hot gas flow coming from the overlying air space and optimal penetration in the latter.

It was found that in this manner there is achieved a rapid mixing of the gaseous flows free from local temperature differences.

For this purpose the velocity of the cooling gas flow leaving said perforated distributor is between 20 and 50 m/s.

The choice of the values in the range defined above depends on the physical characteristics of the gases to be mixed and in particular on the ratio between the flow rates of the gaseous flows.

The characteristics and advantages of the present invention are set forth in the description of an embodiment of a mixing assembly in accordance with the present invention given below by way of non-limiting example with reference to the annexed drawings.

DETAILED DESCRIPTION OF A PREFERRED EMBODIMENT

Figure 1:
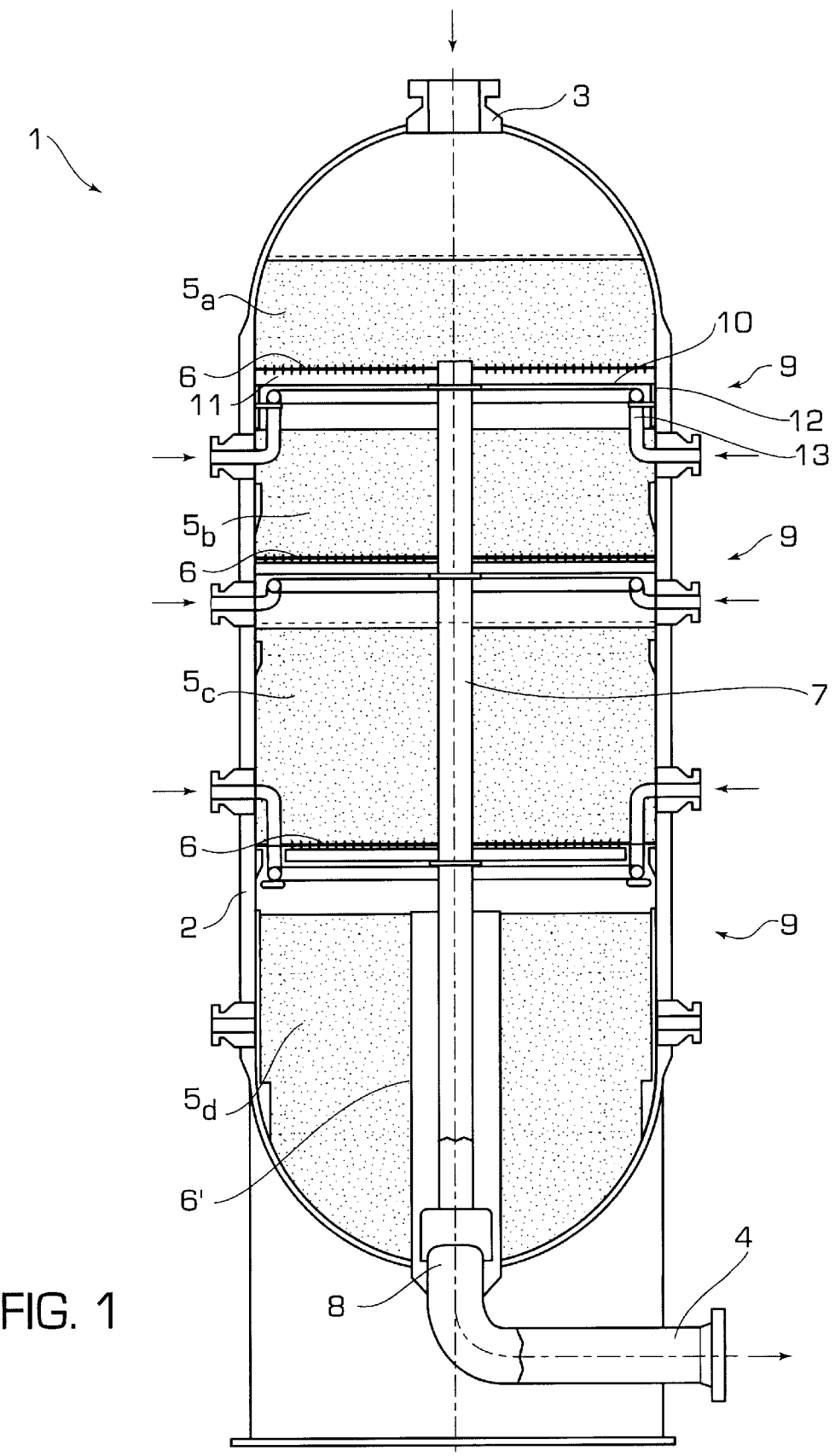
FIG. 1 shows a longitudinal cross section view of an heterogeneous exothermic synthesis reactor incorporating a mixing assembly in accordance with the present invention.

In FIG. 1 reference sign 1 indicates as a whole an heterogeneous exothermic synthesis reactor, in particular for methanol synthesis.

The reactor 1 comprises a tubular external shell 2 provided above with a nozzle 3 for inlet of reagent gases and below with a nozzle 4 for outflow of the reaction products.

Reference signs 5a–5d indicate respective catalytic beds supported in a mutually spaced relationship in the shell 2 by means of a tubular beam 7 extending coaxially with the shell.

Between them, the beds 5a–5c have a bottom comprising a gas permeable wall 6.

Figure 2:
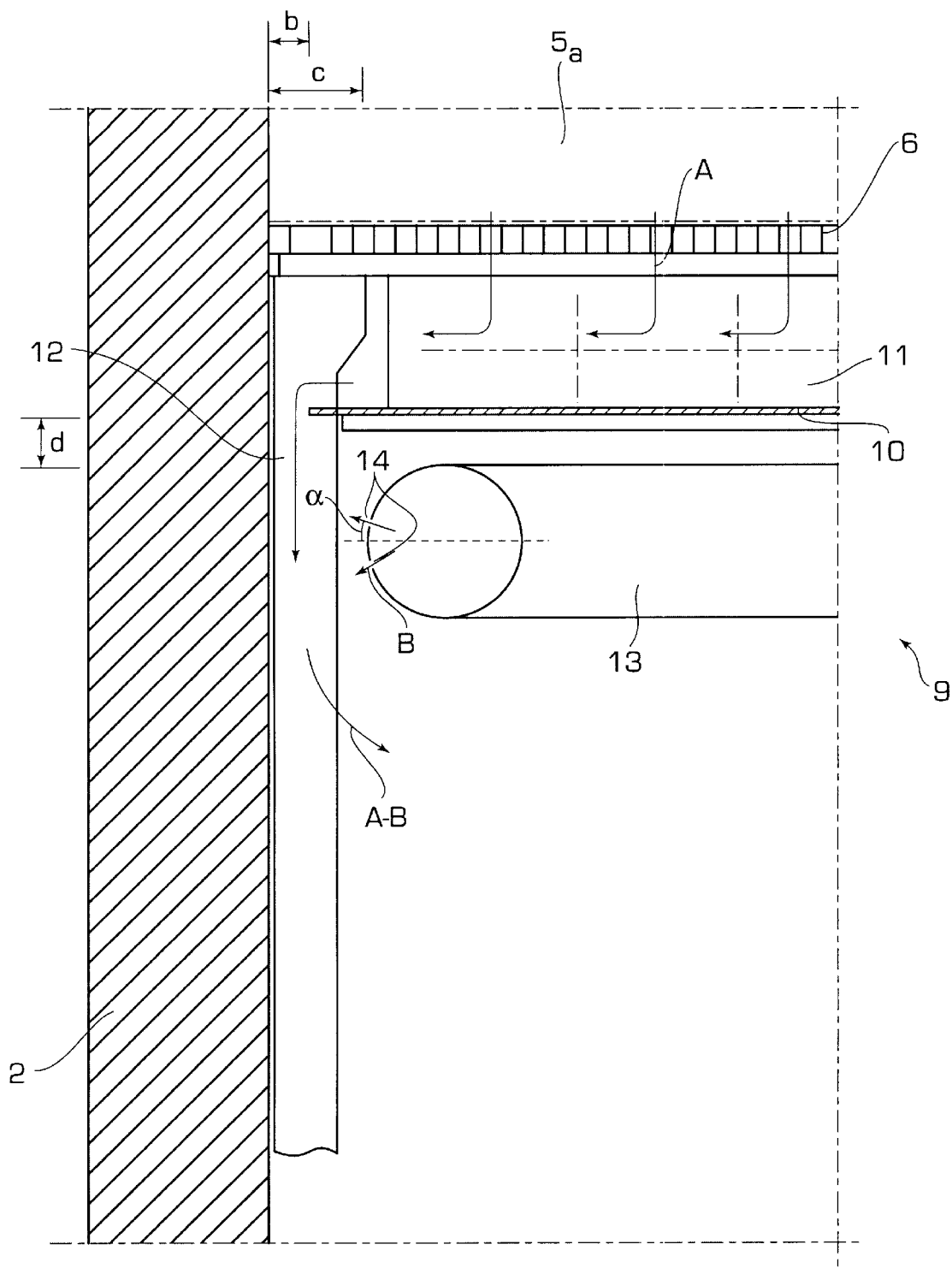
FIG. 2 shows a front cross section view with enlarged scale of some details of the mixing assembly incorporated in the reactor of FIG. 1.
Figure 3:
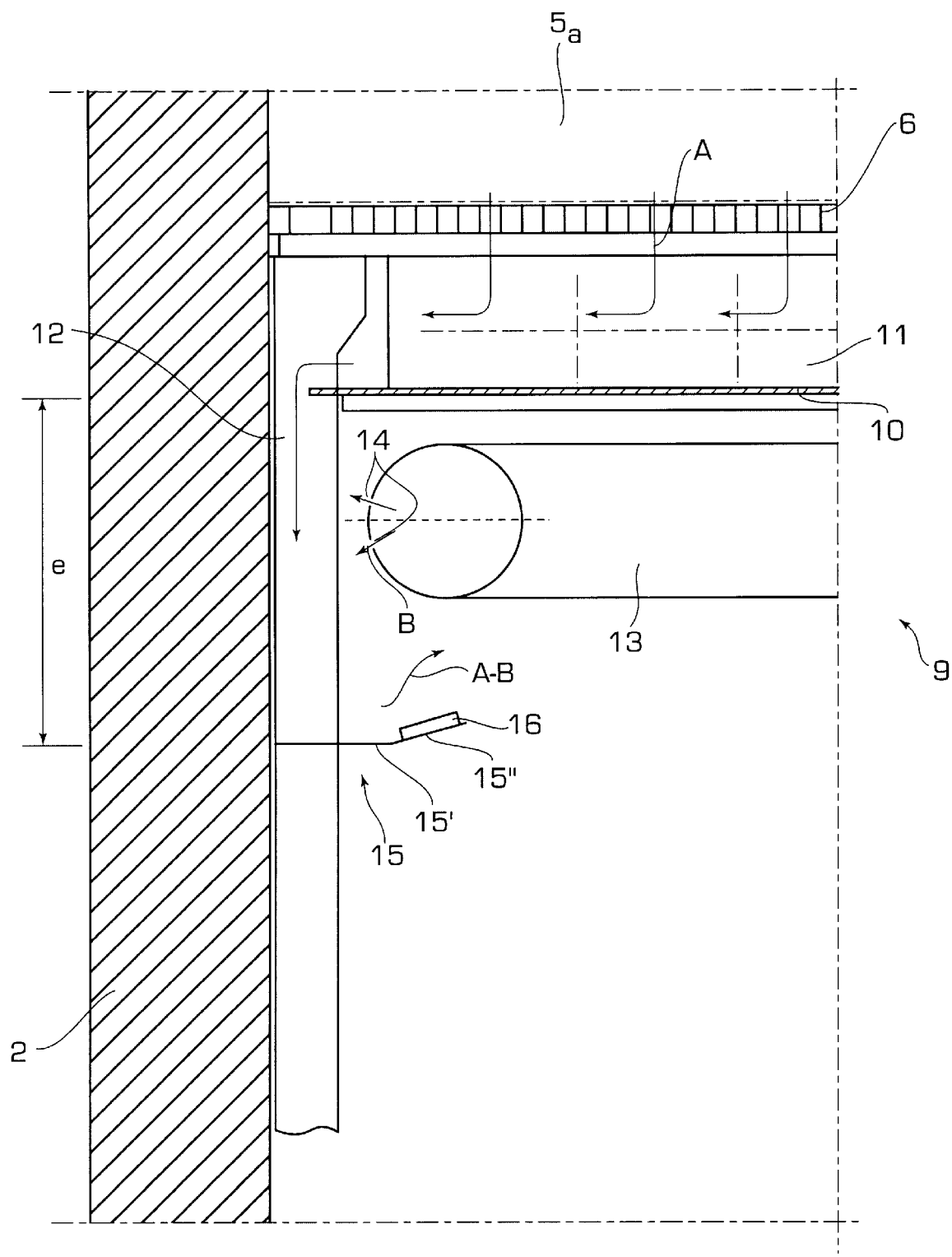
FIG. 3 shows a front cross section view with enlarged scale of some details of an alternative embodiment of the mixing assembly of FIG. 2.

With reference to FIGS. 1–3, reference sign 9 indicates as a whole a gaseous flow mixing assembly carried out in accordance with the present invention.

The mixing assembly 9 comprises a baffle 10 extending below and parallel to the gas permeable wall 6, for instance to the wall 6 of the bed 5a with which it defines an air space 11 for collection of the partially reacted hot gas flow A.

Between the baffle 10 and the inner wall of the shell 2 is defined an annular opening 12 for outlet of said gas flow A from the air space 11.

A perforated distributor 13 of a cooling gas flow B is supported below said baffle 10 at a predetermined distance from said annular opening. The distributor 13 has a substantially toroidal shape and comprises two rows of holes 14 spaced and pitched and extending along a generatrix thereof.

In a preferred embodiment the holes 14 of the distributor 13 have a diameter between 6 mm and 12 mm, and the pitch between two adjacent holes of the two rows of holes 14 is between 20 mm and 60 mm.

The two rows define with a horizontal plan passing through the axis of the distributor 13 an angle a between +10° and −20°, respectively.

The pitch and diameter of the holes 14 mentioned above ensure the cooling gas flow B optimal penetration and suction of all the hot gas flow A coming from the air space 11.

Preferably, the width b of the opening 12 is between 24 mm and 180 mm, the distance c between the distributor 13 and the inner wall of the shell 2 is between 1.5 and 2.5b, and the distance d between the distributor 13 and the baffle 10 is between 0.25 and 0.4c.

In the example shown in FIG. 3 the mixing assembly 9 comprises a deflector 15 consisting of a flat portion 15 ' and a conical portion 15" of variable length supported below the baffle 10, preferably at a distance between 350 mm and 450 mm to promote recirculation of the flows A and B and their intimate contact.

The angle of inclination of the conical surface 15 " in relation to the flat surface 15 ' is preferably less than 45°.

Advantageously, the conical portion of the deflector 15 comprises a row of paddles 16 perpendicular thereto and turned towards the baffle 10 to attenuate any local gaseous flow temperature differences.

In an alternative embodiment not shown the deflector 15 can comprise at least three portions of variable length and with angles to the horizontal plane between 0° and 90°, e.g. three portions with angles of 0°, 25° and 90° respectively.

By means of the mixing assembly 9 described above the mixing method of the present invention is carried out between consecutive catalytic beds of the reactor, for instance between the beds 5a–5b, in the following manner.

In a first step the gaseous reagents are supplied to the bed 5a provided with gas permeable wall 6, where they react partially.

In a second step the flow A of hot gas leaving said gas permeable wall 6 is collected in the air space 11 defined between the bed 5a and the baffle 10 extending below and parallel thereto.

In a third step the flow rate of the hot gas flow A leaving said air space 11 is made as uniform as possible along the entire periphery of the baffle 10 by subjecting said flow A to a pressure drop of predetermined magnitude.

The value of the pressure drop is advantageously between $2.5 \times 10^{-3}$ bar and $4 \times 10^{-3}$ bar.

In a fourth step a cooling gas flow B outgoing at predetermined velocity from the distributor 13 is injected into the hot gas flow A with uniform flow rate coming from the air space 11.

Preferably, the velocity of the cooling gas flow B from the distributor 13 is between 28 and 45 m/s.

In this way, it is possible to achieve in an efficient manner a mixed gas flow A–B downstream of the distributor 13 substantially free of radial temperature gradients.

The mixing assembly and method of the present invention are advantageously applicable also in reactors carrying out heterogeneous synthesis reactions of different kinds such as e.g. ammonia synthesis. In this case, inside the external shell, a cartridge is also provided supporting the catalytic beds.

The mixing assembly is provided between two consecutive catalytic beds inside the cartridge in a manner quite similar to the example of the methanol synthesis reactor shown in FIG. 1.

EXAMPLE 1

The ability to compensate for local variations in the flow rate of hot gas, in a mixing assembly according to the annexed FIG. 3 and in a mixing assembly according to the European patent application EP-A-0 359 952, was simulated by means of a fluid dynamics simulation program known by the name "Fluent" marketed by Fluent Europe Ltd of Sheffield, UK.

In the following Tables I and II are compared the local temperature differences of the mixed gas flow A–B leaving said mixing assemblies.

In both cases the temperatures indicated in Table II refer to the temperature of the gaseous flow A–B at five different sampling points arranged downstream of the deflector and equally spaced along a semicircumference with radius equal to half the radius of the reactor or of the mixing assembly.

To simulate local flow rate deviations, a point value equal to 50% of that assumed under stationary and constant operating conditions was imposed on the hot gas flow leaving the air space, e.g. in correspondence of the central sampling point.

With said simulation program the temperatures of the mixed gas flow at each sampling point were determined.

TABLE I

| Data | EP-A-0 359 952 | Invention |
|---|---|---|
| Air space | | |
| Thickness (mm) | 160 | 160 |
| annular opening b (mm) | 200 | 80 |
| Distributor | | |
| Distance c (mm) | 160 | 160 |
| Distance d (mm) | 10 | 40 |
| No. holes rows | 3 | 2 |
| Holes diameter (mm) | 16 | 7 |
| Holes pitch (mm) | 150 | 50 |
| Gas flow A | | |
| Temperature (°C.) | 267 | 267 |
| Flow rate (average) (m³/s) | 7.05 | 7.05 |
| Gas flow B | | |
| Temperature (°C.) | 57 | 57 |
| Distributor outlet pressure (bar) | 82.7 | 82.7 |
| Flow rate (m³/s) | 0.684 | 0.684 |
| Pressure drop p | | |
| Air space outlet (mm H₂O) | 2.0 | 32 |

TABLE II

| Sampling points | 1 | 2 | 3 | 4 | 5 |
|---|---|---|---|---|---|
| Invention | 239 | 237 | 236 | 237 | 239 |
| Mixed gas flow A-B temperature (°C.) | 239 | 237 | 236 | 237 | 239 |
| EP-A-0 359 952 | | | | | |
| Mixed gas flow A-B temperature (°C.) | 240 | 240 | 219 | 240 | 240 |

As may be seen in Table II the mixing assembly in accordance with the present invention allows achievement of optimal mixing of the gas flows even in the presence of deviations from the local flow rates of the gas leaving the air space, contrary to that allowed by the prior art.

From the foregoing there emerge clearly the numerous advantages achieved by the mixing assembly of the present invention:

optimal mixing degree between gaseous flows having different temperatures;

ability to compensate for possible local variations in the hot gas flow rate and hence ability to maintain the mixing conditions constant;

ability to further increase conversion yield of the heterogeneous exothermic synthesis reactor.

We claim:

1. Method for mixing gaseous flows at different temperatures, in particular in heterogeneous exothermic synthesis reactors of the type comprising a plurality of superimposed catalytic beds (5a–5d) and in which at least one of the beds (5a) is provided with a gas permeable wall (6) for outlet of a hot gas flow (A), said method comprising the steps of:

supplying gaseous reagents to said at least one bed (5a);

reacting said gaseous reagents in said at least one bed (5a);

collecting a hot reaction gas flow (A) leaving said gas permeable wall (6) in an air space (11) defined between said at least one bed (5a) and a baffle (10) extending below and parallel thereto;

directing said hot gas flow (A) in said air space (11) radially outward to an annular opening (12) defined between said baffle (10) and a side wall (2) supporting said at least one bed (5a), the ratio of a width (b) of said annular opening (12) and a thickness of said air space (11) being between 0.2 and 1;

discharging said hot gas flow (A) from said air space (11) through said annular opening (12);

subjecting said hot gas flow (A) flowing through said annular opening (12) to a pressure drop of predetermined magnitude so as to produce a uniform flow rate: and injecting in the hot gas flow (A) thus obtained a cooling gas flow (B) outgoing at predetermined velocity from a perforated distributor (13) supported below said baffle (10) at a predetermined distance from said annular opening (12).

2. Mixing metod according to claim 1 characterized in that the value of the pressure drop of the hot gas flow (A) is between $0.5 \times 10^{-3}$ bar and $6 \times 10^{-3}$ bar.

3. Mixing method according to claim 2 characterized in that the value of said pressure drop is between $2.5 \times 10^{-3}$ bar and $4 \times 10^{-3}$ bar.

4. Mixing metod according to claim 1 characterized in that the velocity of the cooling gas flow (B) leaving said perforated distributor (13) is between 20 and 50 m/s.

* * * * *